United States Patent [19]

Scott

[11] 3,739,171

[45] June 12, 1973

[54] GAMMA RAY SPECTROSCOPY WITH QUANTITATIVE ANALYSIS

[75] Inventor: Hubert D. Scott, Houston, Tex.

[73] Assignee: Texaco Inc., New York, N.Y.

[22] Filed: July 19, 1971

[21] Appl. No.: 163,982

[52] U.S. Cl. .................... 250/83.3 R, 250/83.6 W
[51] Int. Cl. .............................................. G01t 1/16
[58] Field of Search ................ 250/71.5 R, 83.3 R, 250/83.6 W

[56] References Cited
UNITED STATES PATENTS 3,521,064  7/1970  Moran et al. ................. 250/83.6 W Primary Examiner—James W. Lawrence
Assistant Examiner—D. L. Willis
Attorney—Thomas H. Whaley and Carl G. Reis

[57] ABSTRACT

An illustrative embodiment of the invention includes methods and apparatus for obtaining gamma ray spectra of earth formations surrounding an open or cased well borehole. Pulsed neutrons of 14 MEV are used to excite the elements around the well bore and a scintillation detector is activated a predetermined time after each pulse from the source to detect gamma rays resulting from the capture in the earth formation of thermalized neutrons from the source. The spectrum of gamma rays so resulting is obtained and compared with a composite spectrum made up of a weighted mixture of standard spectra by the use of the least squares technique. The gain and threshold values of the standard spectra are adjusted and the composite spectra resulting therefrom are again compared with the unknown spectrum and this process repeated until the best possible fit of the standard composite spectrum is obtained. The weights of the standards so obtained are then logged as a function of borehole depth to provide lithology information.

20 Claims, 5 Drawing Figures

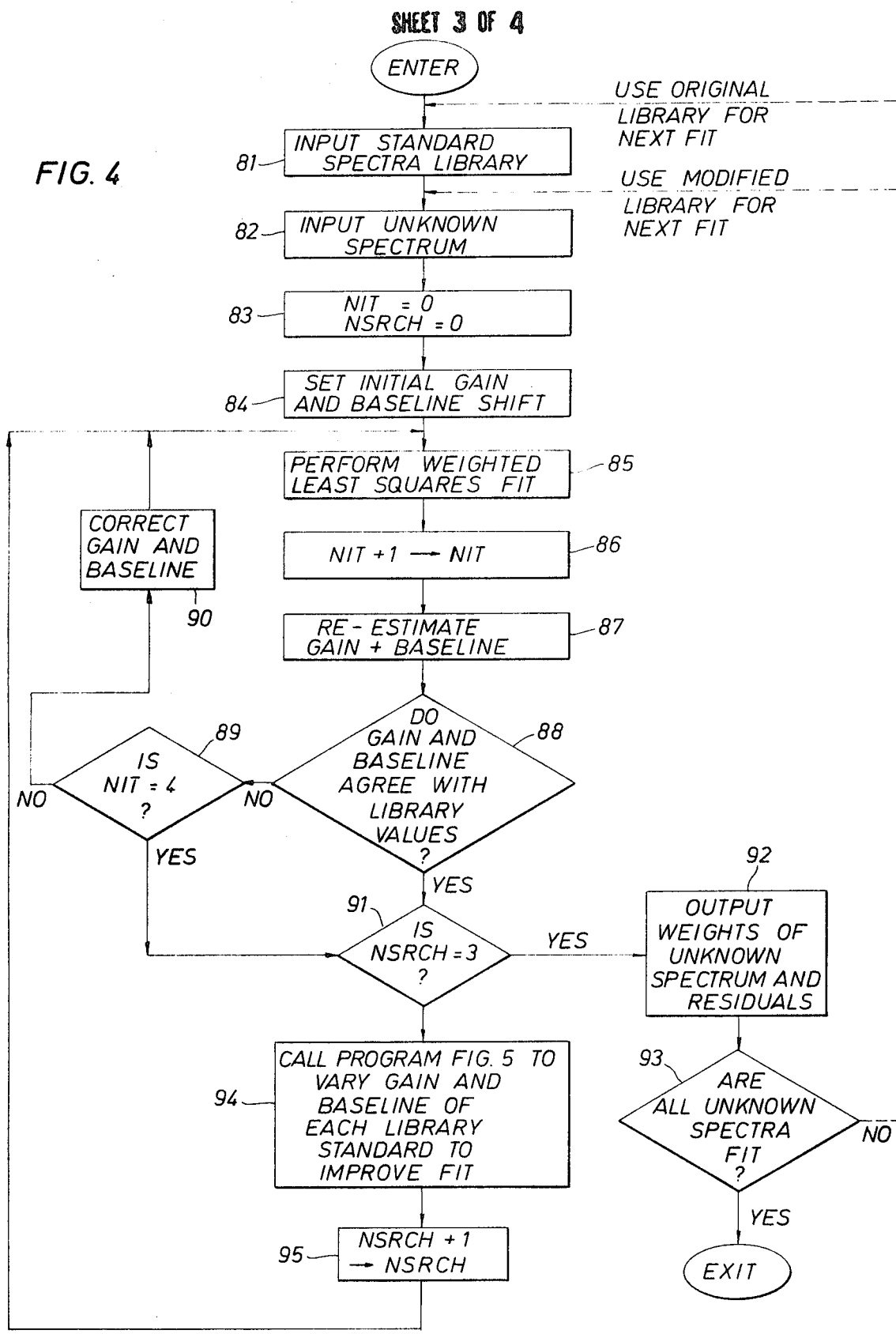

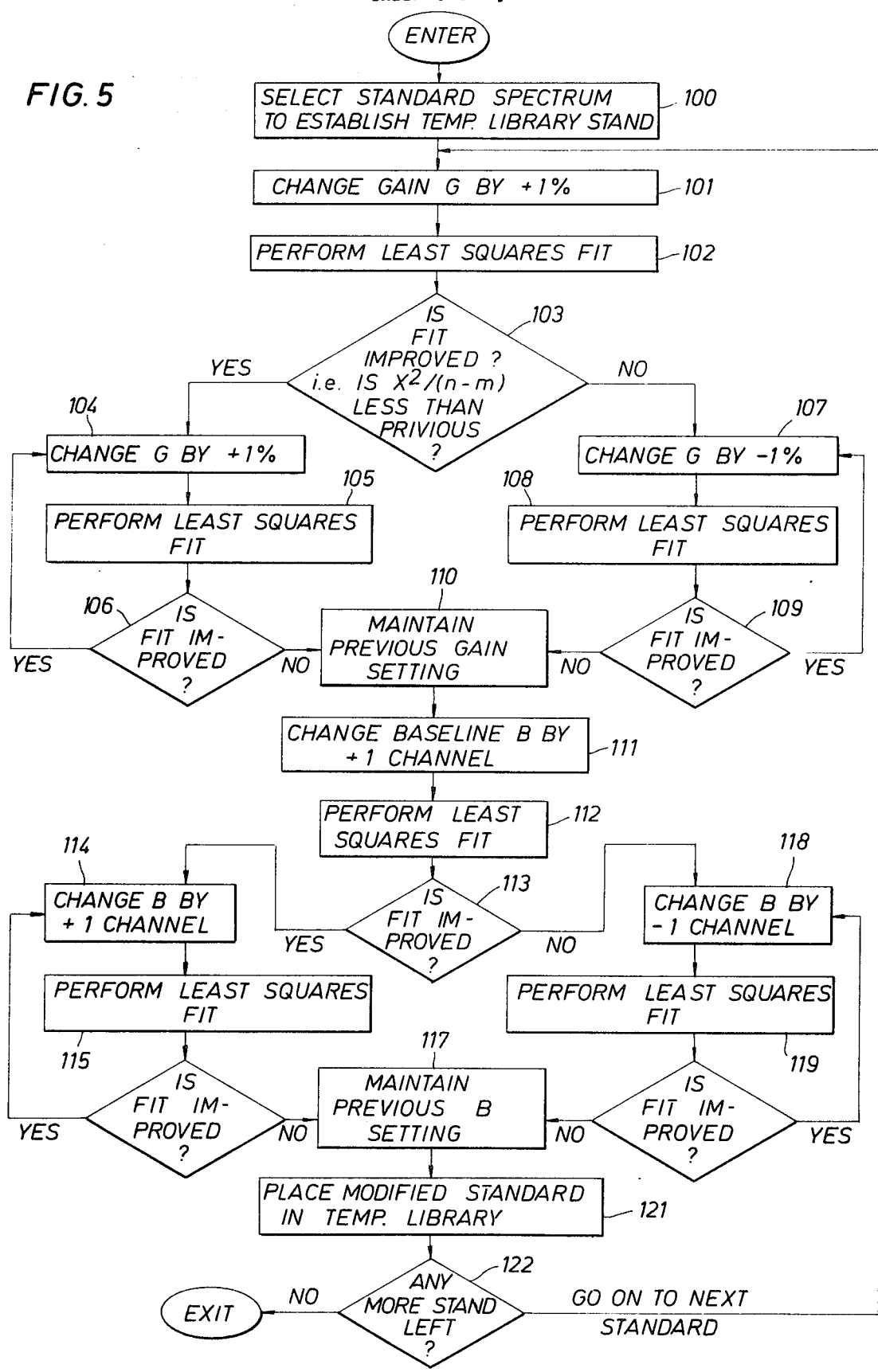

GAMMA RAY SPECTROSCOPY WITH QUANTITATIVE ANALYSIS

This invention relates to methods and apparatus for investigating the characteristics of subsurface earth formations and more particularly relates to improved radioactivity well logging methods and apparatus for determining the lithology of earth formations surrounding a well borehole.

It is well known that earth formations surrounding a well borehole emit natural gamma radiation. It is also well known that nuclei of earth materials surrounding a well borehole may be excited by the capture of neutrons emitted from a well tool in the borehole. Such an excited nucleus may then return to a lower energy level state emitting gamma radiation in the process. The emitted radiation may also be detected by a well tool in the borehole.

It is also known that the gamma radiations emitted by elements which occur naturally in the earth formations surrounding the wellbore or by nuclei which have been excited by neutrons emitted by a well tool having certain characteristic energy spectra. That is to say, if the energy spectra of gamma rays emitted by elements in the materials surrounding the wellbore could be determined accurately such spectra would be indicative of the particular combinations of elements which emitted the gamma rays. Accordingly, it has been proposed in the prior art to determine the constituency of earth formations surrounding a wellbore by obtaining at least portions of the energy spectra of the gamma radiation emitted by the materials surrounding the wellbore both by the naturally occurring gamma radiation and the gamma radiation resulting from the bombardment of the materials surrounding the wellbore by neutrons.

In addition to a qualitative determination of the elements comprising the formation materials surrounding the borehole it is highly desirable to be able to attach a quantitative significance to the appearance of each of these elements, if possible. For example, certain anomalous log interpretations can result in open hole well logging portions of the well which appear to have porous characteristics. These portions of the well may be contaminated by impurities which mask their true nature. Such formations as shaly sands or fresh water filled limestones are difficult to discern compared to clean or uncontaminated oil sands. In such formations it is difficult to interpret the response of conventional logging tools such as electrical or sonic logs which may be used. Moreover, if the well in question is a previously completed well it will generally be impossible to perform electrical surveys to determine the characteristics of formations behind the cemented casing. Thus, in cased or previously completed well boreholes nuclear well logging tools which irradiate the earth formations with penetrating neutron or gamma radiation may be the only means of determining the characteristics of the earth formations behind the casing. It is therefore highly desirable that gamma ray energy spectra of either open or cased boreholes and resulting either from naturally occurring gamma radiation or from induced gamma radiation be recordable and analyzable in a quantitative sense.

Gamma ray energy spectra may be obtained by passing a well logging tool have a proportional detector through the borehole and separating the output of the detector as a function of energy. A proportional detector such as a scintillation counter is typically used for this purpose. A scintillation counter adapted for borehole use typically will contain a scintillating material such as thallium doped sodium iodide or cesium iodide or the like which, when exposed to gamma radiation, will emit flashes of light which are proportional in intensity to the energy of the exciting radiation. These light flashes within the scintillation crystal are then coupled to a photomultiplier tube or other equivalent light detection electronics which produces electrical pulses whose height generally is proportional to the intensity of the light emitted by the scintillation crystal.

The pulses representative of gamma rays having a particular energy represented by the pulse height are then generally processed as, for example, by a pulse height analyzer which sorts the pulses according to their height and accumulates in a number of storage devices, or channels, the number of pulses of a given height which occur. By applying successive pulses produced by the electronic circuitry of the borehole tool to the pulse height analyzer a spectrum of the gamma ray energy of substances in and around the borehole may be obtained. The number of counts occurring in a certain channel is plotted against the channel number (or energy level) of the analyzer channel in question. As many as one thousand or more such analyzer channels may be used to obtain gamma ray spectra in this manner.

Many sources of error can act on the data between the time a gamma ray passes through the scintillation crystal and the time in which the representative electrical pulse corresponding to this event is sorted according to its height. For example, the energy resolution characteristics of the crystal itself may be relatively crude. That is to say, the crystal may emit a light flash of nearly the same intensity for a relatively wide range of initial gamma ray energies. This can occur due to the size of the crystal and the type of energy loss process of $\gamma$ rays in the crystal. This constitutes a physical limitation which is a property of the material comprising the crystal and which must be taken into account when analyzing the gamma ray spectrum resulting from the use of such a crystal.

Generally several thousand feet of well logging cable are interposed between the photomultiplier tube and the surface of the earth at which the multichannel pulse height analyzer instrument is located. Because of this the resulting pulses from the photomultiplier tube must generally be amplified before being transmitted up this relatively long length of electrical cable to the surface. In borehole gamma ray spectroscopy it is of course imperative that this amplification take place in as nearly linear a manner as possible. Therefore any power supply voltage variations or temperature variations which effect the linearity of the amplifier used for this purpose also cause errors. These errors result in a general uncertainty being applied to the amplitude of the pulse representing the light flash intensity prior to its transmission to the surface. This, in turn, results in a general smearing of the features of the overall gamma ray spectrum.

Once the pulse reaches the surface it is applied to the pulse height analyzer. This instrument may, for example, operate by applying the pulse to an integrator circuit which builds up and stores its charge (proportional to its height) in a rapid manner. This charge can be used (if it exceeds a threshold level) to open a gating circuit which may be used, for example, to gate the output of a high frequency oscillator into a counter register. The time required for the pulse to decay to a predetermined level which allows the gate to close then may be measured by examining the contents of the counter register when the gate closes.

It will be appreciated that with this type of pulse height analyzer any error which may occur in the high frequency oscillator frequency due to short term variations in power supply voltage or temperature variations can result in a general fuzzing or broadening of the energy peaks of the gamma ray spectra. Moreover, further amplification of the pulse generally takes place in a typical pulse height analyzer prior to its submission to such a pulse sorting or separating circuit. The linearity of such amplification is critical in determining the resulting shape of the gamma ray energy spectrum. A drift in the gain of such an amplifier can result in an overall displacement or shift of the energy spectrum or a different energy/channel relationship as the pulse's height is varied with respect to the opening threshold of the oscillator gating circuit.

The net result of the operation of all these error sources is to produce a gamma ray spectrum which has smeared out peaks. Such peak smearing causes adjacent peaks, which may be relatively close together in the energy spectrum, to become merged with each other. In particular the base portion of these peaks are superimposed upon each other in such a manner that the overall shape of an individual peak may be indiscernible.

In addition to the above cited instrumentation problems degradation of the gamma rays themselves due to Compton scattering occurs. Similarly the gamma ray source may be other than that assumed. For example an inelastic scattering event may occur as opposed to a thermal neutron capture gamma ray emmission. Such events may result in the gamma ray spectrum being generally smeared out or distorted. All of these factors coupled together lead to a general degradation of the overall quality of the gamma ray spectrum. Such degradation of the quality of the spectrum makes it imperative that a very careful comparison or analysis of the gamma ray spectrum be performed. Mere observations or rough estimates based on visual comparison or other such cut and try methods can lead to the generation of large errors particularly in making only quantitative estimates of the presence of an element.

In the prior art it has been known to visually compare gamma ray energy spectra of standard sources made with the same instrument with unknown gamma ray spectra made in a well borehole. This comparison has largely been qualitative to the present time due to the degradation of the gamma ray spectrum from the error sources as previously mentioned.

Accordingly, it is an object of the present invention to provide new and improved methods and apparatus for analyzing gamma ray spectra to determine the composition of well formations adjacent to a wellbore which effectively overcome the disadvantages of the prior art.

Another object of the invention is to provide new and improved methods and apparatus for analyzing gamma ray spectra of subsurface earth formations by comparing the spectra more accurately than heretofore possible with standard element spectra made with the same instrument.

Yet another object of the present invention is to provide methods and apparatus for making quantitative analysis of gamma ray spectra resulting from gamma radiation emanating from earth formations surrounding a wellbore possible in a manner more accurate than heretofore obtainable.

These and other objects, features and advantages of the present invention are accomplished by obtaining a gamma ray spectrum from the unknown materials surrounding a well borehole. In a preferred embodiment of the invention, this is performed by using neutron irradiation techniques to excite the formations. In this preferred embodiment a pulsed neutron source of high energy neutrons is utilized to excite the elements in the earth formations surrounding the well bore. A scintillation type detector is activated a predetermined time after the conclusion of each neutron pulse so as to allow gamma rays resulting from nuclear excitation of the material in the borehole proper to die away. Scintillation count pulses representing gamma rays emanating from the earth formation surrounding the wellbore are then detected and supplied via a well logging cable to pulse height analyzing apparatus at the surface of the earth. The gamma ray spectrum resulting therefrom is obtained. This unknown gamma ray spectrum is then compared with previously determined standard gamma ray spectra combined in a weighted manner to make up a weighted composite spectrum. The unknown weights of each standard component of the composite spectrum which gives the best fit to the unknown spectrum are determined by application of the method of least squares. A unique iterative scheme for adjusting the gain and baseline or threshold of the standard spectra to best fit the unknown spectrum for elimination of instrumentation error is then applied to insure a more accurate fit in this least squares technique.

Other objects, features and advantages of the invention are pointed out with particularity in the appended claims. The present invention is best understood from the following detailed description thereof when taken in conjunction with the accompanying drawings in which:

BRIEF DESCRIPTION OF THE DRAWINGS

FIG. 4 is an overall logic flow diagram for a computer program for performing the comparison of gamma ray spectra in accordance with the invention; and FIG. 5 is a more detailed logic flow diagram for performing a portion of the overall technique outlined in the diagram of FIG. 4.

DESCRIPTION OF THE PREFERRED EMBODIMENT

Figure 1:
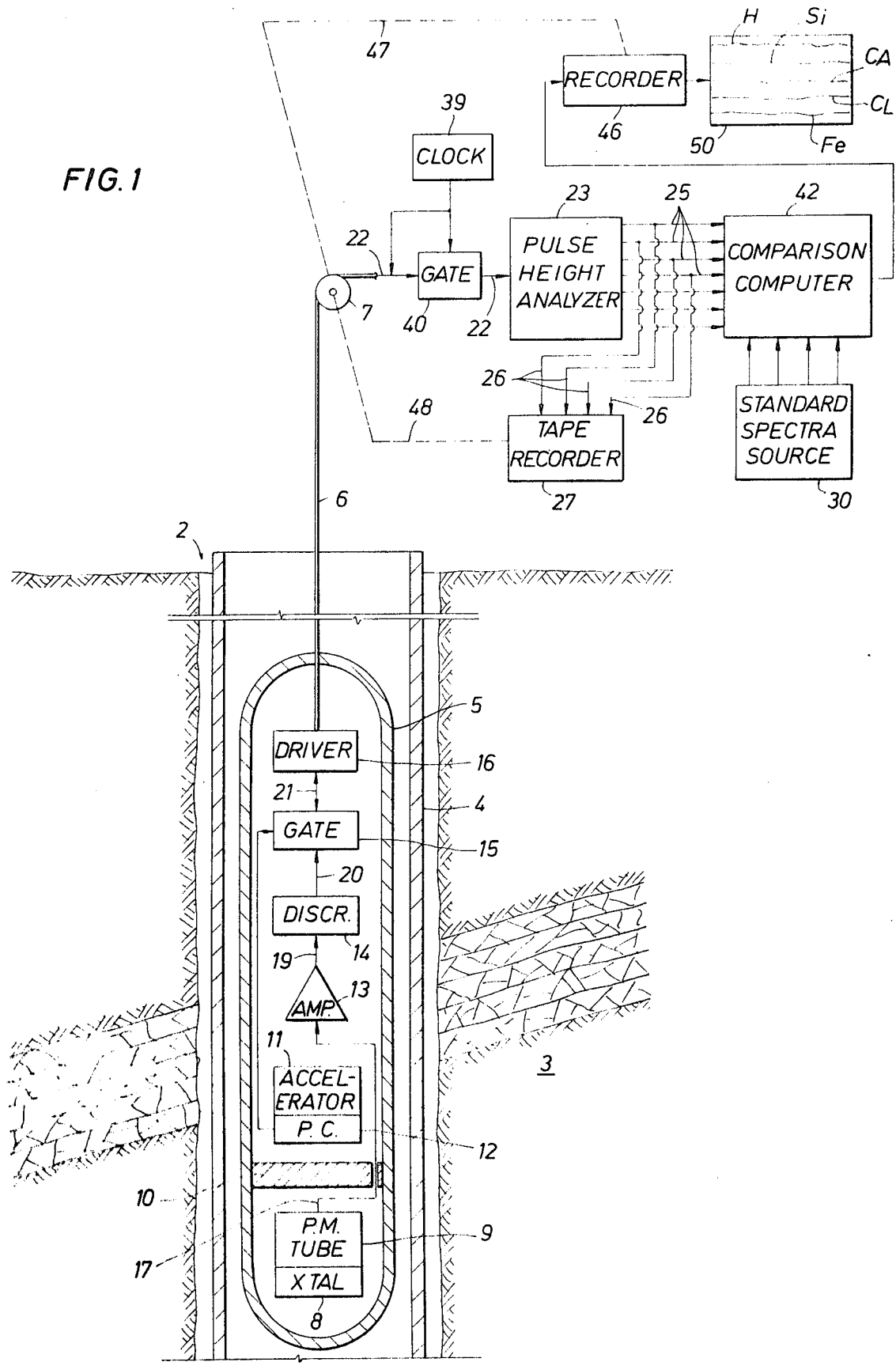
FIG. 1 is an overall block diagram showing schematically a system embodying the concepts of the invention.

Referring initially to FIG. 1 there may be seen a simplified functional representation of the apparatus of the invention showing a borehole 2 in the earth formation 3 which is lined in a conventional manner with a steel casing 4 or the like and which further contains a portion of a well logging system arranged and adapted to investigate preselected characteristics of the surrounding earth formations 3. More particularly the logging system may be seen to be basically composed of an elongated, fluid tight hollow body member or sonde 5 which is adapted to be passed longitudinally through the casing 4. Instrumentation is shown which is located at the surface for processing and recording electrical measurements provided by the sonde 5. A logging cable 6 passing over a sheave wheel 7 is used to support the sonde 5 in the borehole. The cable 6 may have one or more conductors for transmitting electrical signals between the sonde 5 and the surface apparatus.

Again referring to FIG. 1, the sonde 5 contains a source of high energy neutrons 11. The neutron source contemplated for use herein comprises a deuterium-tritium reaction accelerator but it will be understood that the invention is not limited thereto. The neutron source 11 may be of any suitable design, for example, a continuous neutron source could be used if desired, and located at a suitable position within the sonde 5. A suitable radiation detector 8 for detecting capture gamma rays resulting from bombardment of the surrounding earth formations 3 is depicted schematically. This detector 8 may be a sodium iodide, cesium iodide or other crystal or the like which is optically coupled to a photomultiplier tube 9 of suitable design. A radiation shield 10 of suitable composition such as a combination of lead, polystyrene, lucite plastic or other high hydrogen content material or the like is preferably interposed between the accelerator 11 and the crystal 8 to prevent or reduce direct irradiation of the crystal as a result of the neutrons emitted from the accelerator 11.

As is well known in the art the scintillation crystal 8 produces a discrete flash of light whenever a gamma ray passes through the crystal. It is a function of the photomultiplier tube 9 to generate a voltage pulse proportional to the intensity of each such scintillation which occurs in the crystal 8. The intensity of such scintillations is functionally related to the energy of the gamma ray and thus each voltage pulse generated by the photomultiplier tube 9 will have an amplitude functionally related to the terminal energy of the corresponding gamma ray which has been detected. Accordingly, the proportional voltage pulses which are produced by the photomultiplier tube 9 constitute the detector signal applied to a linear amplifier 13 via conductor 17.

The detector signal on conductor 17 may contain other pulses than those sought to be detected. For example, photomultiplier tube 9 itself can generate spurious signals. These signals are usually of a relatively low amplitude and may be discriminated against on this basis. In addition the crystal scintillator 8 may be expected to be struck by some neutrons emanating from the accelerator 11 in spite of the shielding 10. These could be, for example, neutrons which are scattered by the fluid in the borehole 2 and surrounding earth formations 3 and which thereafter return to the vicinity of the sonde by an indirect route to strike the crystal 8 and interact with elements therein. The crystal 8 itself can become activated due to the reaction $I^{127}$ $(N,\gamma)$ $I^{128}$. This reaction will produce gamma rays associated with scintillations in response to the resulting 2.12 MEV beta particle emissions of the radioactive iodine 128. Such spurious scintillations again may be discriminated against by a preset level bias. A conventional discriminator or bias level circuit 14 as known in the art for accomplishing the above discussed background reduction is illustrated schematically in FIG. 1.

The accelerator 11 is preferably connected to a pulsing circuit 12 which may be of conventional design. A suitable gating circuit 15 may be included in the sonde 5 for appropriately actuating the pulsing circuit 12 according to whatever operating sequence may be desired. For example, pulsing circuit 12 can be activated via gate 15 to emit a neutron pulse of a specified duration at a predetermined interval. In this manner the earth formations 3 may be irradiated intermittently by the accelerator 11 rather than constantly. In operation it would be desirable typically to use neutron pulses of about 20 microsecond duration which are repeated from 500 to 1000 times per second.

Output signals from the level discriminator 14 are coupled via conductor 20 to gating circuit 15. Gating circuit 15 may be operated, as will be subsequently described, by a surface timing circuit to maintain synchronism. Thus the discriminated output signals may be gated in a manner to select portions thereof for transmission to the surface, if desired. In this manner selected portions of the detected signals timed relative to the emission of the neutrons by the accelerator 11 may be transmitted via conductor 21 to a cable driving circuit 16. Cable driving circuit 16 may be of conventional design as known in the art. Although not depicted in FIG. 1, it will be understood by those skilled in the art that power is supplied from a surface power source (not shown) via the well logging cable 6 to the sonde. Suitable power supplies (not shown) are provided in the sonde for powering the downhole portion of the equipment.

Referring again to FIG. 1, the detector signals having been discriminated against for background by level and possibly time biases as described are supplied to the logging cable 6 and thence to the surface of the earth. At its surface end the cable 6 may be connected to the input of a second gate 40 which is actuated in synchronism with the gating circuit 15 in the downhole sonde 5. The gate 40 may be used, for example, to permit only groups of counting pulses representing radiation detected by the crystal 8 while the accelerator 11 is quiescent to the subsequent signal processing circuits.

Gate 40 may be actuated by any of several conventional ways to maintain its synchronism with the operation of the downhole gate circuit 15. For example, a "turn on" signal may be supplied via conductor 18 and thereon from pulsing circuit 12. This signal could also be supplied to the surface by the cable 6 for actuating the gate 40. Alternatively as shown in FIG. 1, a clock or other timing circuit 39 may be connected to both the gate 40 and to the surface end of the logging cable 6 and thereby supply timing signals simultaneously and synchronously to both the gate 40 at the surface and via gating circuit 15 to pulses 12 in the downhole sonde thereby maintaining synchronous operation of the pulses and surface circuits.

In any event, the output signal from the gate 40 comprises a sequence of count pulses resulting from gamma rays detected by the downhole crystal 8 which are taken preferably during the time interval after the actuation of the accelerator 11 by a sufficient time interval to insure that most of the pulses due to gamma rays resulting from interactions of the generated neutrons with the borehole associated materials have been eliminated. This may be accomplished in typical formations, for example, by allowing the detector signals through the gate 40 from 200 to 550 microseconds after the cessation of the accelerator 11. This plurality of pulses is supplied to the analyzer 23 which may be a pulse height analyzer known in the art having, for example, 32 or more channels, or energy divisions if desired.

Pulse height analyzer 23 functions to sort and accumulate a running total of the incoming pulses into a plurality of storage locations or channels based on the height of the incoming pulses. In this manner a cumulative record of the number of pulses occurring at each energy may be derived. The output from the pulse height analyzer 23 channels is supplied first via a plurality of lines 25 of a comparison computer where they may be compared (in a manner to be subsequently described) with a weighted plurality of standard gamma ray spectra from a standard spectra source 30. By this comparison a determination of the constituency of the earth formation surrounding the borehole at the depth of the sonde 5 may be determined. This data is supplied to a recorder 46 which as indicated by the dotted line 47 has a record medium driven as a function of depth by a mechanical or electronic linkage with the sheave wheel 7. Alternatively, if desired, the output from the pulse height analyzer 23 channels may be supplied along plural lines 26 to a tape recording apparatus 27 and there stored in digital form on magnetic tape as a function of borehole depth. Dotted line 48 indicates that the tape recorder 27 may be driven as a function of depth of the well tool in the borehole in a manner similar to the recorder 46. The pulse height analyzer output may then later be taken from a tape produced by the tape recorder 27 and compared with standard spectra in a remote location, for example, on a digital computer by the method to be subsequently described for use in the comparison computer 42.

The output from the recorder 46 is shown schematically as a plurality of logs 50 which are the result of the comparison computer comparing the gamma ray energy spectrum of the formation surrounding the borehole with standard spectra. The standard spectra are taken in composite weighted groups for this purpose and the best fit of such composite weighted spectra are obtained in the manner to be described. Thus, for example, the log 50 may record as a function of borehole depth a percentage of hydrogen, silicon, iron, calcium, chlorine or any other postulated materials in the formation surrounding the borehole.

Figure 2:
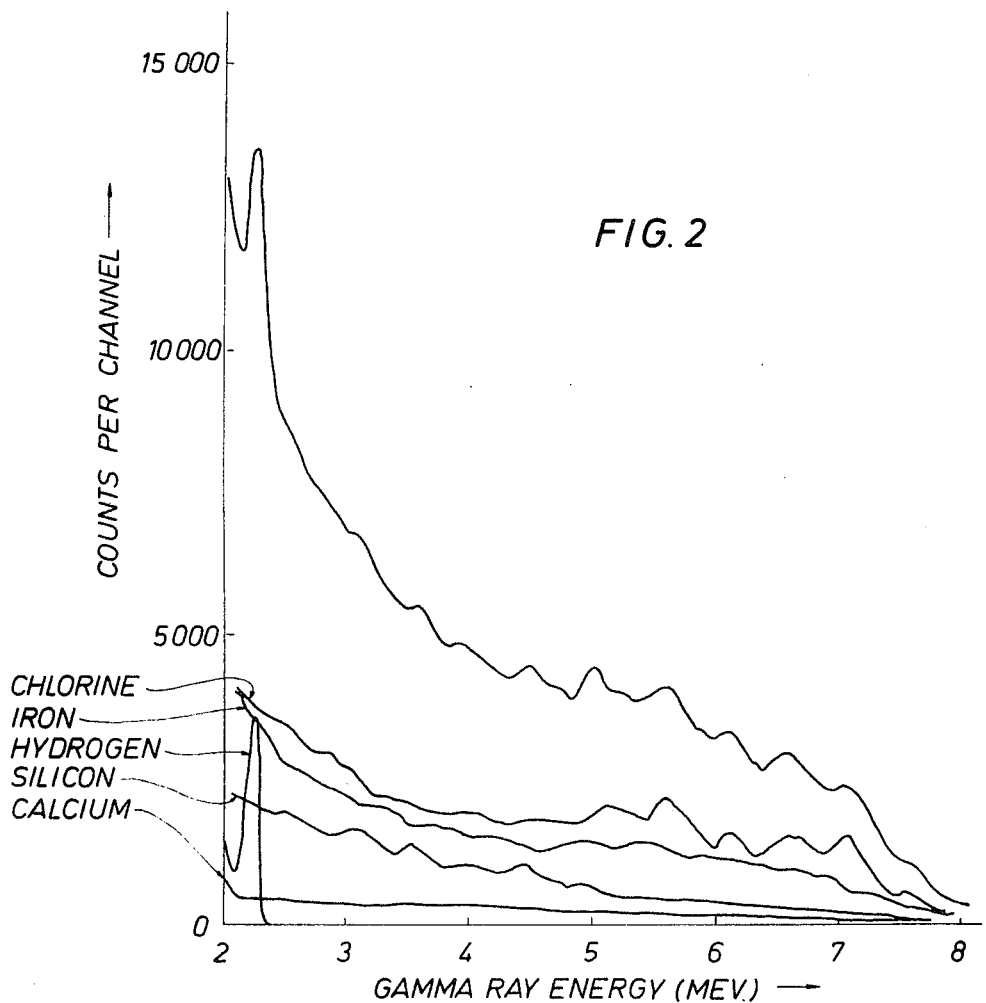
FIG. 2 shows a plurality of standard gamma ray spectra which may be taken in a mix to form a composite spectrum in the manner of the invention.

Referring now to FIG. 2 several standard spectra and a weighted composite spectrum made up of these standard spectra are illustrated schematically. These spectra are obtained in the same manner and with the same tool as the unknown borehole formation spectra and are pre-recorded for use in comparing with the unknown borehole spectrum. A composite spectrum made up of a weighted combination of such standard spectra is used for this purpose. FIG. 2, for example, shows individual gamma ray energy spectra which plot number of counts as the ordinate vs. the gamma ray energy as the abcissa for the elements hydrogen, iron, silicon, calcium and chloride.

If a gamma ray spectrometer such as the system of FIG. 1 includes a multichannel pulse height analyzer, such as analyzer 23 having n channels numbered 1 through n and records a mixed spectra from an unknown gamma ray source containing m nuclei numbered 1 through m, then standard source spectra of known activity may be combined to approximate the unknown gamma ray spectra. If the count rate in channel i of the analyzer from standard spectra $j$ is $a_{ij}$ and the count rate from the unknown mixture in channel $i$ is $b_i$ and if the ratio of the unknown activity in channel $i$ to its corresponding standard's count in channel $i$ is defined as $x_j$ then we may write equation 1:

$$b_i = \sum_{j=1}^{m} a_{ij} x_j + Z_i \qquad (1)$$

where $Z_i$ is a random error. To minimize the errors $Z_i$ the principle of least squares is used. That is to say, the square of the random error $Z_i$ is minimized. If the random errors are summed over the channels $i=1$ to n equation 2 results (for the sum of the squares of the random errors $Z_i$)

$$\sum_{i=1}^{n} Z_i^2 = \sum_{i=1}^{n} \left[ b_i - \sum_{j=1}^{m} a_{ij} x_j \right]^2 \qquad (2)$$

Minimizing this expression by differentiating partially with respect to $x_j$ and setting the resultant equal to zero equation 3 is obtained.

$$\sum_{j=1}^{m} x_j \sum_{i=1}^{n} a_{ik} a_{ij} = \sum_{i=1}^{n} a_{ik} b_i \qquad (3)$$

Equation 3 represents a series of m equations numbered from 1 to $m$ and would in the case of three unknown or postulated nuclei in the mix, for example, be $$x_1 \cdot \sum_n a_{i1}^2 + x_2 \cdot \sum_n a_{i1} \cdot a_{i2} + x_3 \sum_n a_{i1} a_{i3} = \sum_n a_{i1} b_i$$

$$x_1 \cdot \sum_n a_{i1} a_{i2} + x_2 \cdot \sum_n a_{i2}^2 + x_3 \sum_n a_{i2} a_{i3} = \sum_n a_{i2} b_i$$

$$x_1 \cdot \sum_n a_{i1} a_{i3} + x_2 \cdot \sum_n a_{i2} a_{i3} + x_3 \sum_n a_{i3}^2 = \sum_n a_{i3} b_i \qquad (4)$$

where here the summation over n indicates the summation of coefficients $a_{ij}$ over the $n$ channels. By solving these equations for the unknown ratios $x_1 \ldots x_3$ a best fit of the composite spectrum to the unknown spectrum may be obtained. This same type of linear system of $j$ equations in $j$ unknown results for each assumed mix of $j$ elements. This procedure could, for example, be performed by the comparison computer 42 of FIG. 1.

Unfortunately, electronic equipment such as the multichannel pulse height analyzer 23 of FIG. 1 typically has short-term instabilities associated with it as previously discussed. Also temperature variations at different borehole depths and the varying length of cable as the tool is moved causes further dispersions in the pulse height distribution representative of the detected gamma radiation. These instabilities can result in drift of the threshold energy of sensitivity and the variation of energy with cahnnel number. Since these errors occur as a function of time, the electronic characteristic of the instrument at the time the standard spectra are made may not coincide with the electronic characteristics of the same instrument at the time the unknown borehole formation gamma ray energy spectrum is obtained.

Figure 3:
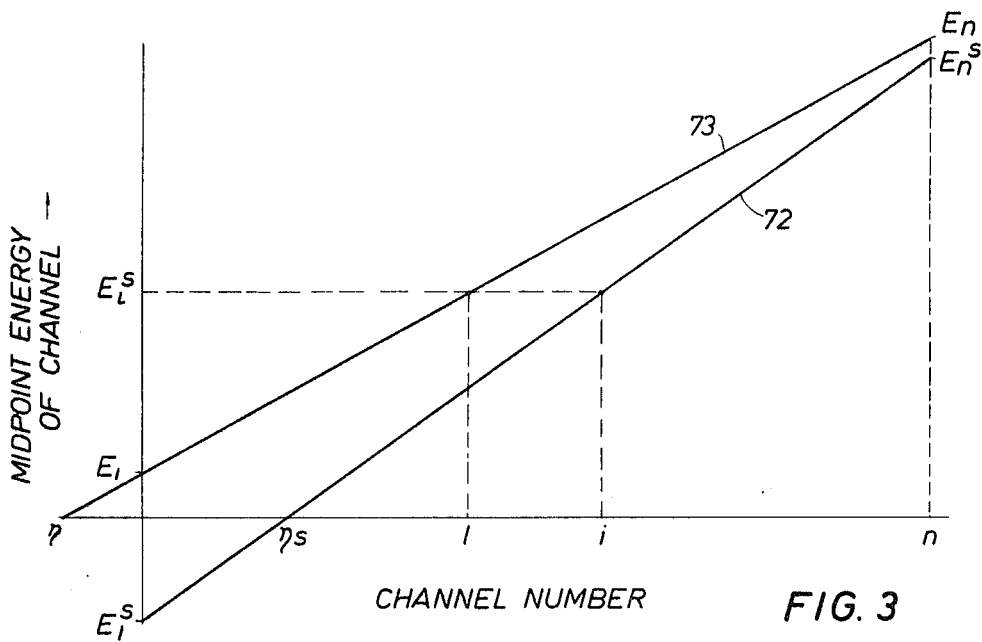
FIG. 3 is a graphical illustration of the effect of a type of instrumentation error which may be accounted for by applying the techniques of the invention.

The result of the short-term instabilities is illustrated schematically in the graph, FIG. 3. Here greatly exaggerated shifts in the threshold and gain are illustrated.

The superscript s refers to the standard samples, i.e., energy $E_1^s$ was the energy at the center of channel 1 at the time the standard spectra were made. Also, the energy $E_n^s$ was the energy of the highest numbered or $n$th channel at the time the standard spectra were made. Generally the response of the instrument fell along the line shown from $E_1^s$ through threshold or baseline value $\eta^s$ to $E_n^s$ in a linear manner as the curve 72 of FIG. 3 illustrates.

From the time the standard spectra were made to the time the unknown spectrum was made the response of the instrument has shifted due to the instabilities mentioned above. This effect is illustrated by the line 73 of FIG. 3. In the curve 73 the threshold energy is $E_1$ for channel 1 and $E_n$ for channel $n$. The response varies in a linear manner as shown with a different threshold and a different slope or gain characteristic. Such variation can cause counts originally appearing in channel 1 when the standard spectra were made to appear in channel $i$ when the unknown spectra are taken.

This type of threshold and gain drift may be taken into account while obtaining the least squares fit of the composite weighted spectrum to the unknown gamma ray spectrum in the manner to be subsequently described. This result is obtained by using an iterative technique in the manner of the invention where in the threshold channel (baseline) and gain of the standard spectra individually and in the composite are varied during the process of obtaining the last squares fit of the unknown to the standard spectra. This allows a more optimum fit with the unknown spectrum to be obtained than would otherwise be possible.

The iterative technique for obtaining an optimum least squares fit of the unknown spectrum to a weighted mixture of the standard spectra may best be described by reference to FIGS. 4 and 5. Referring initially to FIG. 4 the overall logic flow for the least squares fitting technique is illustrated schematically in the form of the logic flow chart for a digital computer program.

A program to perform the technique illustrated in the logic flow may be operated on a computer such as the comparison computer 42 of FIG. 1. Alternatively if the unknown spectra have been stored on tapes such as produced by the tape recorder 27 of FIG. 1, these may be processed by a different, possibly remotely located, computer at a later time.

In any event when the computer program of FIG. 4 is entered or started, the first step is to input the standard spectra library to the computer as indicated at block 81, FIG. 4) from an input device such as the standard spectra source 30 of FIG. 1. Such a source could comprise, for example, a magnetic tape having the previously recorded standard spectra thereon, punched computer cards, a computer disc file record or any other convenient source of data storage. These standard spectra could comprise, for example, digital recordings of the number of counts, the channel number, the gain (or slope of the instrument response as in FIG. 3) and the baseline (or threshold, as $\eta$ of FIG. 3) of the instrument. When the standard spectrum library is input, the next step is illustrated at block 82 as inputting the unknown spectrum to be fitted to a weighted combination of standard spectra. The program then proceeds to block 83 where two counters (NIT and NSRCH) are both initialized by setting them equal to zero. Counter NIT counts the number of iterations to be performed while adjusting the gain and baseline of the composite weighted standard spectrum for a fit to an unknown spectrum. The counter NSRCH counts the number of searches through the standard spectra in varying their individual gains and baselines to most nearly fit the unknown. This is in keeping with the overall technique of the invention which is to vary these quantities to reach an optimum fit.

The program then proceeds to block 84 at which an initial estimate of the gain and baseline of the weighted mixture of standard spectra to be used in the fit is made. This may, for example, be based on the gain and baseline of the standard spectra as input from the library or may result from modified library spectra which will be subsequently described which have been obtained from previous fittings of unknown spectra.

The next step taken by the program is indicated at block 85. This is to perform a weighted least squares fit of the standard spectra taken in a weighted combination to the unknown specteum being examined. The term "weighted least squares fit" as used in block 85 means that the entire spectrum (i.e., the standard spectrum made up of a composite of standard individual spectra) is weighted statistically in each channel by a factor of $1/\sqrt{n}$ where n is the number of counts in that particular channel or energy range of the composite spectrum. This statistical weighting is done to enhance the statistical value of the fit as it may be shown that the standard deviation (a measure of the reliability) of a channel is proportional to the square root of the number of counts appearing in that channel. Weighting in this manner tends to give a proper accordance to channels having more counts than to other channels containing less counts. The term "weighted mixture" of standard spectra as used herein corresponds to the unknown ratios $x_j$ mentioned previously. These are the ratios of the individual elements of the standard spectra to the postulated individual components in the unknown spectrum being examined which are determined by the method of least squares.

By the term "perform least squares fit" as used in describing the program logic flow of FIGS. 4 and 5, it is meant to solve the system of linear equations (such as those illustrated by Equations 4) for the unknown ratios $x_j$ and thereby obtain an estimate of the proportion of each of the postulated elements in the unknown spectrum. This solution may be obtained by any of the known techniques for solving linear systems as desired.

When the first least squares fit is performed at block 85, the next step in the program is to increase the iterations counter NIT by 1 and then, as indicated at block 87, to re-estimate the gain and baseline of the composite or source spectrum in a manner which will tend to possibly enhance the fit of the source spectrum to the unknown spectrum. At block 88 a test is performed to see if the gain and baselines so estimated agree with the library values of the gain and baselines of the source spectrum. Taking the case where they do not agree, which is the most likely to occur initially, a test is performed at block 89 to determine if four iterations have been performed re-estimating the gain and baseline. If not, the program proceeds to block 90 where the gain and baseline of the source spectrum are corrected and the program then proceeds back to block 85 to perform another weighted least squares fit. This process will be continued until the test at block 89 is exhausted (i.e., until four iterations have been performed with corrected gain and baselines of the composite or source spectrum). When the test at block 89 passes (i.e., when four iterations have been performed) the program then proceeds to block 91 to determine if at least three searches (i.e., individual spectra gain and baseline variances) of the standard spectra have been performed. Block 91 is also entered from the test at block 88 if the gain and baseline setting, when re-estimated, agrees with the current library value.

If three searches through the standard spectrum have not been performed, then at block 94 the subprogram described in more detail in FIG. 5 is called to vary the gain and baseline of each of the library standard spectra individually to possibly enhance the fit of the combination spectrum made up of these library spectra. This function is performed as many as three times, and each time it is performed the counter NSRCH is increased by 1 as indicated by block 95 and the program loops back to resume least squares fitting of the re-estimated source weighted spectrum at block 85. If at least three separate passes through the subprogram called at block 94 are performed, then it is assumed that the best possible fit of the weighted combination of standard spectra has been made to the unknown spectrum and as indicated at block 92 the computed weights of the postulated elements of the last least squares fit of the unknown spectrum to the standard source spectrum is output along with th residuals or differences between the two spectra (the composite and the unknown) in each channel or energy range. This output may be in the form, for example, of a well log of the computed weights or percentages of the elements of the postulated combination of standard spectra contained in the unknown spectrum.

Finally, if all of the unknown spectra are fit, as indicated by the test at block 93, the program exits, finished. Otherwise, it loops back to pick up the next unknown spectrum using either the modified library spectra as generated by the subprogram to be described in respect to FIG. 5 or to resume curve fitting using the standard input spectrum library. These alternative steps are indicated by the dotted lines of FIG. 4.

Referring now to FIG. 5, the details of the subprogram called in block 94 of FIG. 4 are shown. This illustrates how the gain and baseline of each individual library standard spectrum comprising the postulated composite spectrum, being fit to an unknown spectrum by the method of least squares, are individually varied to improve the overall fit.

When the subprogram is entered, an initial standard spectrum is selected at block 100. This spectrum is used to establish the temporary library standard whose gain and baseline are to be varied to see if a possible better fit may be obtained. For example, the hydrogen spectrum of FIG. 2 may be picked first for this purpose. Alternately, any of the other standard spectra could be selected, of course. The program proceeds at block 101 to change the gain (i.e., the slope of the count vs. energy curve, such as curve 72 or 73 of FIG. 3) by +1 percent. Using this changed gain setting, then the program (block 102) performs a least squares fit of the new composite spectrum with the unknown spectrum.

With the new least squares fit (using the varied gain) the program proceeds at block 103 to determine if the fitted improved over that previously obtained. This test is done by the comparing of the present value of the ratio of $X^2$, (where $X^2$ identified in equation 5) divided by the quantity $(n - m)$ to the previous value has decreased $$x^2 = \sum_{n=1}^{m} (y_i - y_i^1)^2/y_i^1 \qquad (5)$$

In the above expression the $y_i$ represents the counts of the standard spectra while the $y_i^1$ represents the counts of the unknown spectrum in the same channel. Here also $n$ equals the number of channels used in the spectrum and $m$ equals the number of standard spectra taken in the composite mixture. If changing the gain by +1 percent initially did improve the fit, then the program proceeds to block 104 where the gain is again increased by 1 percent and, as indicated at block 105, another least squares fit using this new gain changed individual spectrum taken in composition with the remaining standard spectra is made. Using this new least squares fit a test is performed at block 106 to see if again the increase of gain enhanced the fit. This is the same type of test as performed at block 103. In this manner the program loops back to block 104 as long as a gain increase enhances the fit. If this no longer enhances the fit, then the program proceeds to block 110.

If the original gain change of +1 percent did not enhance the fit, then the gain is decreased by 1 percent as indicated at block 107 and a least squares fit is performed at block 108 with the decreased gain setting. At block 109 the program determines if this improves the fit of the composite spectrum. As long as this process (i.e., decreasing the gain) does improve the fit, the program loops back to block 107 from block 109 to continue reducing the gain until an optimum fit is obtained. Finally, when the optimum fit is obtained by reducing the gain, the program goes to block 110 where the gain settings are established in the optimum manner for this individual spectrum in the overall composite mix of standard spectra.

When the program exits from block 110, the best gain setting for an individual spectrum component is established. The program then proceeds at block 111 to change the baseline setting $b$, by + one channel. With this done and using the newly established gain, the program proceeds at block 112 to determine a new least squares fit of the composite weighted mixture with the unknown spectrum. At block 113 a test is performed in the same manner described with respect to block 103 to see if the fit is enhanced by this process. If the fit is enhanced, the program proceeds (block 114) to change the baseline by +1 channel again and to perform a new least squares fit of the composite source spectrum (block 115) using this fitting of the baseline. If, as indicated by the test at block 116, this process again improves the fit of the composite spectrum to the unknown, the program loops back to block 114 and continues the baseline or threshold change until this procedure no longer improves the fit. At that time the program goes to block 117 with the baseline setting established.

Returning to block 113, if changing the baseline by +1 channel does not improve the fit as indicated by this test, the program then proceeds to block 118 and reduces the baseline setting by one channel. A new least squares fit of the composite spectrum is performed with this reduced baseline and the previously established optimum gain. At block 120 a test is performed with this least squares fit data to determine if the fit has been improved. If this does improve the fit, the program loops back to block 118 and continues reducing the baseline setting by one channel until no further improvement occurs.

At that time the program exits from block 117 to to block 121 placing the gain and baseline modified standard spectrum in a modified library of spectra. This modified spectra library may be used in fitting to further unknown spectra if desired (this step is indicated by the dotted line alternatives of FIG. 4). The program then proceeds to block 122 where it determines if there are any more standard spectra left to vary. If not, the program exits and is finished with the variation of all individual standard spectra gain and baseline.

Alternately, it will be understood, that if desired that the gain and baseline of the spectra can be varied by less than ±1 percent or ±1 channel to achieve an optimized fit. For example, it is possible that after NSRCH=3 or NIT=2 that a finer mesh such as ±0.1 percent or ±0.1 channel could be used if desired. Of course, still finer gradations could be used if further accuracy were called for.

In this manner, it is seen that the technique of the present invention includes variation in gain and baseline or threshold setting of the composite weighted mixture of standard spectra to best fit the unknown spectrum. The variation is accomplished both by varying the gain and baseline of the composite spectra itself and then by separately varying the gain and baseline of the individual components comprising the postulated composite of standard spectra. It should be noted also that in this technique in addition to the unknown weights or percentages $x_j$ which are determined by the method of least squares fitting, that the overall statistics are enhanced by weighting the counts in each channel by their statistical value.

The above description may make alternative techniques apparent to those skilled in the art. It is the aim in the appended claims to cover all such changes and modifications as may be made apparent to those skilled in the art in order that the true spirit and scope of the invention will be protected.

What is claimed is:

1. A method for determining the unknown composition of earth formations surrounding a well borehole comprising the steps of:
   obtaining standard gamma ray energy spectra of materials postulated to be in formations surrounding a well bore;
   obtaining gamma ray energy spectra of the unknown materials surrounding a well borehole;
   comparing each unknown gamma ray spectrum with a composite standard spectrum comprising a weighted mixture of said standard spectra at a selected number of energy levels at least as numerous as the individual postulated components of said weighted mixture; and
   varying an energy to intensity characteristic of the composite spectrum and repeating the above comparing step in an iterative manner to achieve an optimized comparison of said composite standard spectrum and said unknown spectrum.

2. The method of claim 1 wherein the standard gamma ray energy spectra and the unknown gamma ray energy spectra are obtained in the same manner and the standard spectra are obtained prior to obtaining the unknown spectra.

3. The method of claim 1 and further including the step of obtaining standard gamma ray energy spectra of materials not postulated to be formation constituents but postulated to be borehole constituents.

4. The method of claim 3 wherein the standard spectra of both postulated formation constituents and postulated borehole constituents are used in the comparing and varying steps.

5. The method of claim 1 wherein the gamma ray energy spectra are obtained by use of a pulse neutron source to excite the formations about the borehole.

6. A method for determining the composition of earth formations surrounding a well borehole comprising the steps of:
   obtaining standard gamma ray energy spectra of materials postulated to be in formations surrounding a well bore;
   obtaining gamma ray energy spectra of the unknown materials surrounding a well borehole;
   comparing each unknown spectrum with a composite standard spectrum comprising a weighted mixture of said standard spectra and determining the ratio of each of the postulated materials in the composite standard spectrum to the unknown spectrum at a plurality of energy levels in the spectra at least as numerous as the number of postulated components in the composite spectrum;
   varying the gain and baseline of the composite spectrum and repeating the comparing step in an iterative manner to achieve an optimized comparison of said composite standard spectrum and said unknown spectrum; and
   recording said ratios or a quantity related thereto as being indicative of the amount of each of said postulated materials.

7. The method of claim 6 wherein the steps of obtaining the unknown gamma ray spectra, comparing the standard spectra, varying the gain and baseline of the composite spectrum and recording said ratios are repeated at various borehole depths and said ratios are recorded as a function of borehole depth.

8. The method of claim 6 and further including the step of varying the gain and baseline of selected individual standard spectra comprising said composite standard spectra and repeating the comparing and varying steps using new composite spectra made up of the individually varied standard spectra to obtain a still further optimized comparison of said standard spectra and said unknown spectra.

9. The method of claim 8 wherein the steps of obtaining the unknown spectra, comparing the standard spectra, varying the gain and baseline of the composite standard spectrum, varying the gain and baseline of the individual standard spectra comprising said composite standard spectrum and recording said ratios are repeated at various borehole depths and said ratios are recorded as a function of borehole depth.

10. A method for determining the unknown composition of earth formations surrounding a well borehole comprising the steps of:
   obtaining standard gamma ray energy spectra of materials postulated to be in and about a well borehole;
   obtaining gamma ray energy spectra of the unknown materials in and about a well borehole;
   comparing each unknown gamma ray spectrum with a composite standard spectrum comprising a weighted mixture of said standard spectra at a selected number of energy levels at least as numerous as the individual postulated components of said weighted mixture;

varying an energy to intensity characteristic of the composite standard spectrum and repeating the above comparing step in an iterative manner to achieve an optimized comparison of said composite and said unknown spectra;

varying an energy to intensity characteristic of selected individual components of said composite standard spectrum and repeating the above comparing and varying steps to achieve an even further optimized comparison of said composite and said standard spectra.

11. The method of claim 10 wherein the standard gamma ray energy spectra are obtained prior to said unknown spectra and said standard spectra and said unknown spectra are obtained in the same manner.

12. The method of claim 10 wherein the gamma ray energy spectra are obtained from neutron activated materials, said materials being activated by use of a pulsed neutron source.

13. The method of claim 10 wherein the step of comparing the unknown gamma ray spectrum with a composite standard spectrum comprising a weighted mixture of individual standard spectra components is performed by determining the ratio of each of the postulated materials in the unknown spectrum to the same material in said composite standard spectrum.

14. The method of claim 13 wherein said ratios are determined by using the method of minimizing the squares of the random errors occuring when said spectra are obtained.

15. The method of claim 14 wherein said ratios $x_j$ are determined by solving a linear system of $k$ equations of the form $$\sum_{i=1}^{n}\left[\sum_{j=1}^{m} x_j a_{ij} - b_i\right] a_{ik} = 0$$
$$k = 1, 2 \ldots m$$

where $a_{ij}$ is the count appearing in energy level $i$ from standard composite spectrum component $j$, $b_i$ is the count appearing in energy level $i$ of the unknown spectrum and wherein the index $k = 1, 2 --- m$ is at least as numerous as the $m$ standards comprising the composite standard spectrum.

16. The method of claim 10 wherein the energy to intensity characteristic of the composite spectrum which is varied to obtain an optimized comparison in the gain of composite spectrum.

17. The method of claim 16 wherein a second energy to intensity characteristic of the composite spectrum, the baseline, is also varied to obtain an optimized comparison.

18. The method of claim 10 wherein the energy to intensity characteristic of said selected individual components of said composite spectrum which is varied to obtain an optimized comparison is the baseline of said component.

19. The method of claim 18 wherein a second energy to intensity characteristic of said selected individual components of said composite spectrum, the gain, is also varied to obtain an optimized comparison.

20. The method of claim 10 and further including the step of recording said unknown spectra so obtained as a function of borehole depth.

* * * * *